US012651766B2

(12) United States Patent
Brezesinski et al.

(10) Patent No.: US 12,651,766 B2
(45) Date of Patent: Jun. 9, 2026

(54) COATED PARTICULATE MATERIAL COMPRISING COMPLEX LAYERED OXIDE FOR USE AS ELECTRODE ACTIVE MATERIAL, RESPECTIVE METHODS OF MAKING AND USES THEREOF

(71) Applicants: BASF SE, Ludwigshafen am Rhein (DE); Karlsruher Institut für Technologie, Karlsruhe (DE)

(72) Inventors: Torsten Brezesinski, Eggenstein-Leopoldshafen (DE); Joern Kulisch, Ludwigshafen (DE); Pascal Hartmann, Ludwigshafen (DE); A-Young Kim, Eggenstein-Leopoldshafen (DE); Florian Strauss, Eggenstein-Leopoldshafen (DE)

(73) Assignees: BASF SE, Ludwigshafen am Rhein (DE); KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 1080 days.

(21) Appl. No.: 17/618,702

(22) PCT Filed: Jun. 11, 2020

(86) PCT No.: PCT/EP2020/066166
§ 371 (c)(1),
(2) Date: Dec. 13, 2021

(87) PCT Pub. No.: WO2020/249659
PCT Pub. Date: Dec. 17, 2020

(65) Prior Publication Data
US 2022/0246977 A1     Aug. 4, 2022

(30) Foreign Application Priority Data
Jun. 13, 2019     (EP) ..................................... 19180075

(51) Int. Cl.
*H01M 10/0525*     (2010.01)
*H01M 4/36*     (2006.01)
*H01M 4/505*     (2010.01)
*H01M 4/525*     (2010.01)
*H01M 10/0562*     (2010.01)

(52) U.S. Cl.
CPC ....... *H01M 10/0525* (2013.01); *H01M 4/366* (2013.01); *H01M 4/505* (2013.01); *H01M 4/525* (2013.01); *H01M 10/0562* (2013.01); *H01M 2300/0068* (2013.01)

(58) Field of Classification Search
CPC .. H01M 10/0525; H01M 4/366; H01M 4/505; H01M 4/525; H01M 10/0562; H01M 2300/0068; H01M 2004/028; H01M 4/131; H01M 4/1391
See application file for complete search history.

(56) References Cited

U.S. PATENT DOCUMENTS

| | | | |
|---|---|---|---|
| 2001/0055717 A1 | 12/2001 | Fauteux et al. | |
| 2005/0227147 A1 | 10/2005 | Kogetsu et al. | |
| 2008/0268340 A1 | 10/2008 | Kuwahara et al. | |
| 2017/0155132 A1 | 6/2017 | Kong et al. | |
| 2021/0135199 A1* | 5/2021 | Washida ............... | H01M 4/525 |

FOREIGN PATENT DOCUMENTS

| | | | |
|---|---|---|---|
| EP | 2472663 A1 | 7/2012 | |
| EP | 2623461 A1 | 8/2013 | |
| EP | 3460887 A1 | 3/2019 | |
| EP | 3671916 A1 | 6/2020 | |
| WO | WO-2019035418 A1* | 2/2019 | ........ H01M 10/0562 |

OTHER PUBLICATIONS

Uddin, Jamal Md, "High Energy Lithium-Deficient, Multiphase LixNiyMnzC01-y-zO2 (x <1) Cathode Materials For Lithium-Ion Battery", Dissertation for Doctorate of Philosophy Degree, North Carolina A&T State University, 2018, 20 pages.
Zheng et al., "Li- and Mn-Rich Cathode Materials: Challenges to Commercialization", Advanced Energy Materials, Mar. 22, 2017, 25 pages.
Zhou et al., "Innovative Approaches to Li-Argyrodite Solid Electrolytes for All-Solid-State Lithium Batteries", Accounts of Chemical Research 54, No. 12, pp. 2717-2728, May 25, 2021.
Zhou et al., "Tuning charge-discharge induced unit cell breathing in layer-structured cathode materials for lithium-ion batteries", Nature Communications 5, No. 1, 8 pages, Nov. 18, 2014.
H. Visbal et al. report in the Journal of Power Sources, 269 (2014) 396-402.
International Search Report for PCT/EP2020/066166 mailed Sep. 1, 2020, 3 pages.

* cited by examiner

*Primary Examiner* — Adam A Arciero

(74) *Attorney, Agent, or Firm* — Armstrong Teasdale LLP

(57)     ABSTRACT

Described is a coated particulate material for use as electrode active material in an electrode and/or in a solid-state lithium-ion electrochemical cell and/or in an all solid-state lithium-ion electrochemical cell, comprising a plurality of core particles, each core particle comprising at least one nickel-containing complex layered oxide, and disposed on the surfaces of the core particles, a coating comprising carbonate ions, lithium and at least one further element. Further described is an electrode for use in a solid-state or all solid-state lithium-ion electrochemical cell and a respective electrochemical cell, each of them comprising said coated particulate material. Also described herein are methods of making the coated particulate material and the electrode, as well as respective uses of the coated particulate material.

17 Claims, No Drawings

COATED PARTICULATE MATERIAL COMPRISING COMPLEX LAYERED OXIDE FOR USE AS ELECTRODE ACTIVE MATERIAL, RESPECTIVE METHODS OF MAKING AND USES THEREOF

CROSS-REFERENCE TO RELATED APPLICATION(S)

The present application is a national phase of International Application No. PCT/EP2020/066166, filed on Jun. 11, 2020, which claims the benefit of European Patent Application No. 19180075.4, filed on Jun. 13, 2019. The contents of these applications are hereby incorporated by reference in their entirety.

FIELD OF THE INVENTION

The present invention relates to a coated particulate material for use as electrode active material in an electrode and/or in a solid-state lithium-ion electrochemical cell and/or in an all solid-state lithium-ion electrochemical cell, comprising a plurality of core particles, each core particle comprising at least one nickel-containing complex layered oxide, and disposed on the surfaces of the core particles, a coating comprising carbonate ions, lithium and at least one further element. Moreover, the present invention pertains to an electrode for use in a solid-state or all solid-state lithium-ion electrochemical cell and to a respective electrochemical cell, each of them comprising said coated particulate material. The present invention also relates to methods of making the coated particulate material and the electrode as well as to respective uses of the coated particulate material.

BACKGROUND OF THE INVENTION

High energy density solid-state batteries or all-solid-state batteries may be realized through application of the components (i) a nickel-containing complex layered oxide cathode material or other metal oxide cathode material and (ii) a solid electrolyte based on lithium, sulfur and phosphorus. Of said components, a combination of a nickel-containing complex layered oxide cathode material and a solid electrolyte based on lithium, sulfur and phosphorus have proven to be particularly effective in a solid-state lithium-ion electrochemical cell and/or in an all solid-state lithium-ion electrochemical cell.

It has, on the other hand, also been reported that solid electrolytes based on lithium, sulfur and phosphorus may be incompatible with a nickel-containing complex layered oxide cathode material or other metal oxide cathode material when in direct contact with such cathode material, thereby impeding reversible operation of a respective solid-state or all solid-state lithium-ion electrochemical cell (battery) in certain cases.

Several attempts have therefore been made to avoid direct contact between a nickel-containing layered oxide cathode material or other metal oxide cathode material and a respective solid electrolyte, e.g. by covering the oxidic cathode material on its surface with a shell or coating of certain materials, thus aiming at obtaining high oxidative stability and at the same time high lithium-ion conductivity of the oxidic cathode material and to so achieve or improve stable cycling performance of a solid-state or all solid-state lithium-ion electrochemical cell comprising said aforementioned components.

Document EP 2 472 663 A1 provides a solid-electrolyte battery comprising a $LiCoO_2$ positive-electrode active material and a $LiNbO_3$ film positioned on it, and a solid electrolyte.

H. Visbal et al. report in the Journal of Power Sources, 269 (2014) 396-402, that certain carbonate species on the surface of a $LiNi_{0.8}Co_{0.15}Al_{0.05}O_2$ electrode active material have an influence on electrochemical properties of an all-solid-state lithium-ion battery of said electrode active material and a sulfide-based solid electrolyte. It was found that the rated discharge performance improved with the reduction of the carbonate concentration on the electrode material surface due to the decrease of the interface resistance. It was also found that the surface carbonate species reacted with the sulfide electrolyte to form an irreversible passivation layer which obstructs the charge transfer process at the cathode/electrolyte interface and results in the rise of the interface resistance and drop of the rated discharge capability.

SUMMARY OF THE INVENTION

Document EP 3 460 887 A1 (equivalent of WO 2018/012522 A1) pertains to a positive electrode active material for an all-solid-type lithium secondary battery wherein particles of a spinel-type composite oxide are coated with an amorphous compound containing lithium and at least one other element in a certain ratio, for improving lithium-ion conductivity and resistance properties of a respective battery. This document also discloses that a similar improvement cannot be achieved when particles of a layered lithium nickel manganese cobalt composite are used instead of the spinel-type composite oxide.

Document US 2008/268340 A1 discloses a non-aqueous electrolyte secondary cell and a method for producing the same.

Document US 2005/227147 A1 pertains to a positive electrode active material for a nonaqueous electrolyte secondary battery, a production method thereof and a nonaqueous electrolyte secondary battery using the same.

Document EP 2 623 461 A1 deals with a lithium-transition metal oxide powder, a method for producing the same, a positive electrode active material for a lithium ion battery and a lithium ion secondary battery.

Document US 2017/155132 A1 discloses a surface-treated positive electrode active material for a lithium secondary battery, a method for preparing the same and a lithium secondary battery comprising the same.

Document US 2001/055717 A1 deals with an electrochemical cell having a surface-modified electrode and an associated fabrication process.

In the light of the prior art, there is still a need for a nickel-containing complex layered oxide which can be used as electrode active material together with a solid electrolyte comprising lithium, sulfur and phosphorus and which shows enhanced stability and improved electrochemical properties. Likewise, there is still a need for a respective electrode and an electrochemical cell, both comprising such nickel-containing complex layered oxide and a solid electrolyte comprising lithium, sulfur and phosphorus. Furthermore, there is a need for respective methods of making said nickel-containing complex layered oxide, said electrode and said electrochemical cell.

Correspondingly, it was a primary object of the present invention to provide a coated particulate material comprising core particles of a nickel-containing complex layered oxide, where the core particles are coated with a protective layer to enhance or improve the electrochemical properties of an electrochemical cell comprising such core particles as electrode active material or as part of an electrode active material, in particular when in contact with a solid electrolyte comprising lithium, sulfur and phosphorus.

A more specific aspect of the object of the present invention was to provide an electrode comprising said particulate material and a solid electrolyte comprising lithium, sulfur and phosphorus, and a solid-state or all-solid-state lithium-ion electrochemical cell comprising such electrode and/or such coated particulate material, where the charge and/or discharge properties of the respective solid-state and/or all-solid-state electrochemical cell are improved.

A further object of the present invention was to provide methods of making said coated particulate material and said electrode.

It has now surprisingly been found that the primary object and other objects of the present invention can be accomplished by a coated particulate material for use as electrode active material in an electrode and/or in a solid-state lithium-ion electrochemical cell and/or in an all solid-state lithium-ion electrochemical cell, comprising or consisting of C1) a plurality of core particles, each core particle comprising or consisting of at least one complex layered oxide comprising (i.e. one or more additional components can be present and preferably one or more additional components are present as explained below):
lithium,
nickel and
one or both members of the group consisting of cobalt and manganese, and C2) disposed on the surfaces of the core particles, a coating comprising
carbonate anions,
lithium and
at least one member of the group consisting of aluminium, boron, niobium, phosphorus, silicon, tantalum, titanium, zinc, zirconium and mixtures thereof,
wherein preferably the at least one member is selected from the group consisting of aluminium, boron, niobium, phosphorus, tantalum, zinc, zirconium and mixtures thereof,
or
from the group consisting of boron, niobium, phosphorus, silicon, tantalum, titanium, zinc, zirconium and mixtures thereof.

In the coated particulate material of the present invention as defined above, the at least one complex layered oxide is a complex oxide which has a layered structure as explained in more detail below. Such layered structure of the at least one complex layered oxide is different from a spinel-type structure of other metal oxide cathode materials known from the prior art, e.g. as known from document EP 3 460 887 A1.

The complex layered oxides and the core particles comprising or consisting of said complex layered oxides are known per se, as well as methods for their preparation.

It has now been found that the coated particulate material of the present invention has excellent electrochemical properties and shows improved charge and/or discharge properties when used as electrode active material in contact with a solid electrolyte comprising lithium, sulfur and phosphorus, in particular as component of an electrode (more in particular as component of a positive electrode, at discharge) in a solid-state or all-solid-state lithium-ion electrochemical cell. The coated particulate material of the present invention has also been found to be significantly more stable against degradation than the plurality of (uncoated) core particles (comprising or consisting of at least one complex layered oxide) when used in direct contact with a solid electrolyte comprising lithium, sulfur and phosphorus.

DETAILED DESCRIPTION OF THE INVENTION

The invention as well as preferred variants or alternatives and preferred combinations of parameters, properties and elements thereof are defined in the appended claims. Preferred aspects, details, modifications and advantages of the present invention are also defined and explained in the following description and in the examples stated below.

In the coated particulate material of the present invention as defined above, the coating C2) is disposed on the surfaces of at least a part of the core particles, preferably it is disposed on the surfaces of >50% of the total number of core particles, more preferably on the surfaces of ≥75% of the total number of core particles, even more preferably on the surfaces of ≥90% of the total number of core particles and yet even more preferably on the surfaces of ≥95% of the total number of core particles present in the particulate material. For the purposes of the present invention, the part of the core particles on whose surfaces the coating C2) is disposed can preferably be determined by electron microscopy performed on a (representative) sample of a plurality of core particles.

In the coated particulate material of the present invention as defined above, the coating C2) is disposed on at least a part of the surface of a (an individual) core particle, preferably it is disposed on >50% of the total surface of a core particle, more preferably on ≥75% of the total surface of a core particle and even more preferably on ≥90% of the total surface of a core particle. For the purposes of the present invention, the part of the surface of a core particle on which the coating C2) is disposed can preferably be determined by electron microscopy performed on a (representative) sample of core particle or a (representative) sample of a plurality of core particles.

In the coated particulate material of the present invention as defined above, the lithium present in the coating C2), more preferably the total amount of lithium present in the coating C2), is preferably present as part of one or more compounds, selected from the group consisting of:
lithium carbonate ($Li_2CO_3$),
lithium niobate ($LiNbO_3$), preferably amorphous lithium niobate,
lithium zirconate ($Li_2ZrO_3$), preferably amorphous lithium zirconate,
lithium tantalate ($LiTaO_3$), preferably amorphous lithium tantalate,
lithium phosphate ($Li_3PO_4$),
lithium borate ($Li_3BO_3$),
lithium aluminate ($LiAlO_2$)
and
$Li_6ZnNb_4O_{14}$.

In a preferred variant of the present invention, the total amount of lithium present in the coating C2) is present as part of one or more compounds, selected from the group consisting of:
lithium carbonate ($Li_2CO_3$),
lithium niobate ($LiNbO_3$), preferably amorphous lithium niobate
and
lithium zirconate ($Li_2ZrO_3$), preferably amorphous lithium zirconate; wherein preferably the one or more compounds are selected from the group consisting of:

lithium carbonate ($Li_2CO_3$)

and lithium niobate ($LiNbO_3$), preferably amorphous lithium niobate.

In the coated particulate material of the present invention as defined above, the at least one member of the group consisting of aluminium, boron, niobium, phosphorus, silicon, tantalum, titanium, zinc, zirconium and mixtures thereof is preferably present in the coating C2) in each case as part of a compound, more preferably as part of an oxygen-containing compound. In a preferred variant of the present invention, the at least one member of the group consisting of aluminium, boron, niobium, phosphorus, silicon, tantalum, titanium, zinc, zirconium and mixtures thereof (preferably the at least one member selected from the group consisting of aluminium, boron, niobium, phosphorus, tantalum, zinc, zirconium and mixtures thereof) is present in each case as a part of one or more compounds wherein the (respective) one or more compounds are selected from the group consisting of $LiNbO_3$, $Li_2ZrO_3$, $LiTaO_3$, $Li_3PO_4$, $Li_3BO_3$, $LiAlO_2$, $Li_6ZnNb_4O_{14}$ and $Zn_3(PO_4)_2$. In a particularly preferred variant of the present invention, the at least one member of the group consisting of aluminium, boron, niobium, phosphorus, tantalum, zinc, zirconium and mixtures thereof is present in each case as a part of one or more compounds wherein the (respective) one or more compounds are selected from the group consisting of $LiNbO_3$, $Li_2ZrO_3$, $LiTaO_3$, $Li_3PO_4$, $Li_3BO_3$, $LiAlO_2$ and $Zn_3(PO_4)_2$.

Niobium is most preferably present in the coating C2) as part of $LiNbO_3$ in the context of the present invention and for all variants of the present invention as described herein.

A coated particulate material according to the present invention as defined herein (or a coated particulate material according to the present invention as described above or below as being preferred) is preferred, wherein the at least one complex layered oxide of the plurality of core particles further comprises at least one member of the group consisting of aluminium, barium, boron, magnesium, molybdenum, titanium, tungsten, zirconium and mixtures thereof, preferably the at least one complex layered oxide of the plurality of core particles further comprises aluminium (preferably when the at least one complex layered oxide of the plurality of core particles does not comprise manganese)

and/or is or comprises a compound of formula I:

$$Li_{1+t}A_{1-t}O_2 \qquad (I),$$

wherein

A comprises nickel and preferably further comprises one or both members of the group consisting of cobalt and manganese, at least one element selected from the group consisting of aluminium, barium, boron and magnesium and one or more transition metals not selected from the group consisting of nickel, cobalt and manganese, wherein at least 50 mole-% of any transition metals present in A is nickel, and t is a number in the range of from −0.05 to 0.2.

A coated particulate material according to the present invention as defined herein (or a coated particulate material according to the present invention as described above or below as being preferred) is particularly preferred, wherein the at least one complex layered oxide of the plurality of core particles is or comprises a compound of formula II $$Li_{1+x}[Ni_{1-u-v-w}Co_uMn_vM_w]_{1-x}O_2 \qquad (II),$$

wherein

M is a member of the group consisting of aluminium, barium, boron, magnesium, molybdenum, titanium, tungsten, zirconium, and mixtures of at least two of the foregoing elements, preferably is or comprises aluminium (preferably when v is 0), x is a number in the range of from −0.05 to 0.2, u is a number in the range of from 0.01 to 0.2, preferably of from 0.04 to 0.2, v is a number in the range of from 0 to 0.2, preferably of from 0.04 to 0.2, w is a number in the range of from 0 to 0.1 and (u+v+w) is ≤0.4 and preferably is ≤0.3.

In the coated particulate material of the present invention as defined above, the component "M" can stand for any individual member of the group of elements as defined above (e.g. the component "M" can stand for tungsten, i.e. "W") or it can stand for two or more members of the group of elements as defined above (e.g. the component "M" can stand for a group consisting of tungsten, zirconium and titanium). Where the component "M" stands for two or more members of the group of elements as defined above, the index (number) "w" accompanying the component "M" applies to the total group of elements representing "M", as defined above.

In preferred variants of the present invention, the compound of formula I and/or the compound of formula II of the plurality of core particles C1) comprises one or more compounds from the specific layered-structured families of compounds of "lithium nickel manganese cobalt oxide" (often abbreviated to "NMC" or "NCM"; particularly preferably the type known as "NCM622") and/or of lithium nickel cobalt aluminium oxide" (often abbreviated to "NCA"). Particularly preferred compounds of formula I and/or of formula II of the plurality of core particles C1) are selected from the group consisting of $Li_{1+x}[Ni_{0.85}Co_{0.10}Mn_{0.05}]_{1-x}O_2$; $Li_{1-x}[Ni_{0.87}Co_{0.05}Mn_{0.08}]_{1-x}O_2$; $Li_{1+x}[Ni_{0.83}Co_{0.12}Mn_{0.05}]_{1-x}O_2$; $Li_{1+x}[Ni_{0.6}Co_{0.2}Mn_{0.2}]_{1-x}O_2$ (NCM622); $Li_{1+x}[Ni_{0.88}Co_{0.08}Al_{0.04}]_{1-x}O_2$; $Li_{1+x}[Ni_{0.905}Co_{0.0475}Al_{0.0475}]_{1-x}O_2$ and $Li_{1+x}[Ni_{0.91}Co_{0.045}Al_{0.045}]_{1-x}O_2$.

Also preferred is a coated particulate material according to the present invention as defined herein (or a coated particulate material according to the present invention as described above or below as being preferred), wherein the at least one complex layered oxide of the core particles is or comprises a compound of formula IIa $$Li_{1+x}[Ni_{1-u-v}Co_uMn_v]_{1-x}O_2 \qquad (IIa),$$

wherein x and u have the meanings as defined above for a compound of formula II, v is a number in the range of from 0.04 to 0.2 and (u+v) is ≤0.4, preferably is ≤0.3 and/or comprises or has a crystallographic unit cell of space group R3m.

In preferred variants of the present invention, the compound of formula IIa of the plurality of core particles C1) comprises one or more compounds from the specific layered-structured families of compounds of "lithium nickel manganese cobalt oxide" (often abbreviated to "NMC" or "NCM"; particularly preferably the type known as "NCM622"). Particularly preferred compounds of formula IIa of the plurality of core particles C1) are selected from the group consisting of $Li_{1+x}[Ni_{0.88}Co_{0.08}Al_{0.04}]_{1-x}O_2$; $Li_{1+x}[Ni_{0.905}Co_{0.0475}Al_{0.0475}]_{1-x}O_2$ and $Li_{1+x}[Ni_{0.91}Co_{0.045}Al_{0.045}]_{1-x}O_2$.

Preferred is furthermore a coated particulate material according to the present invention as defined herein (or a coated particulate material according to the present invention as described above or below as being preferred), wherein the coating C2) comprises carbonate anions in a total amount of ≥0.12 mass-%, preferably of ≥0.15 mass-%, more preferably of >0.15 mass-%, relative to the total mass of the plurality of (uncoated) core particles C1);
and/or (preferably "or")
carbonate anions in a total amount in the range of from 0.12 mass-% to 3.0 mass-%, preferably of from 0.15 mass-% to 2.5 mass-%, more preferably of from 0.15 to 2.0 mass-% even more preferably of from 0.15 mass-% to 1.0 mass-%, relative to the total mass of the plurality of (uncoated) core particles;
and/or (preferably "and")
the coating comprises at least one member of the group consisting of boron, niobium, tantalum, zirconium and mixtures thereof,
wherein preferably the coating comprises at least one member of the group consisting of niobium, zirconium and mixtures thereof,
wherein more preferably the or at least one member of the group is niobium.

In the coated particulate material of the present invention as defined above, the at least one member of the group consisting of boron, niobium, tantalum, zirconium and mixtures thereof (preferably the at least one member of the group consisting of niobium, zirconium and mixtures thereof) is preferably present in the coating C2) as part of a compound, more preferably as part of an oxygen-containing compound. In a preferred variant of the present invention, the at least one member of the group consisting of boron, niobium, tantalum, zirconium and mixtures thereof (or its preferred variants as defined here above) is present in each case as a part of one or more compounds wherein the (respective) one or more compounds are selected from the group consisting of $LiNbO_3$, $Li_2ZrO_3$, $LiTaO_3$ and $Li_3BO_3$.

It has been found in own experiments that best results are obtained in terms of (initial) discharge capacities and/or in terms of (initial) Coulombic efficiencies of a solid-state or all solid-state lithium-ion electrochemical cell comprising a positive (at discharge) electrode comprising a coated particulate material according to the present invention as defined above as electrode active material, and a solid electrolyte comprising lithium, sulfur and phosphorus, when the coating C2) of the coated particulate material comprises carbonate ions in the total amounts specified above, in particular when the coating C2) of the coated particulate material comprises carbonate ions in at least the minimum amount or concentration of ≥0.12 mass-%, preferably of ≥0.15 mass-%, relative to the total mass of the plurality of (uncoated) core particles.

In certain variants of the present invention, in particular where an electrode and/or a solid-state and/or an all-solidstate electrochemical cell comprises a coated particulate material according to the present invention as defined above as electrode active material and a solid electrolyte comprising lithium, sulfur and phosphorus with a lithium-ion conductivity at 25° C. of ≥0.1 mS/cm, preferably in the range of from ≥0.1 to ≤1 mS/cm, more preferably $Li_3PS_4$, yet more preferably orthorhombic $\beta$-$Li_3PS_4$, a coated particulate material according to the present invention as defined herein (or a coated particulate material according to the present invention as described above or below as being preferred) is preferred, wherein the coating C2) comprises carbonate anions in a total amount in the range of from 0.12 mass-% to 1.0 mass-%, preferably of from 0.15 mass-% to 0.75 mass-%, relative to the total mass of the plurality of (uncoated) core particles.

In the coated particulate material of the present invention as defined above, at least a part of the carbonate ions present in the coating C2) is preferably present as part of an ionic compound, more preferably as part of a salt and even more preferably at least a part of the carbonate ions present in the coating C2), preferably the total amount of carbonate ions present in the coating C2), is present as lithium carbonate.

A coated particulate material according to the present invention as defined herein (or a coated particulate material according to the present invention as described above or below as being preferred) is therefore also preferred, wherein at least a part of the carbonate ions, preferably the total amount of carbonate ions, present in the coating C2) is present as lithium carbonate;
and/or (preferably "and")
the coating C2) comprises at least one member of the group consisting of $LiNbO_3$, $Li_2ZrO_3$ and mixtures thereof, preferably in a total amount in the range of from 0.1 mass-% to 3.0 mass-%, more preferably of from 0.2 mass-% to 2.5 mass-%, yet more preferably of from 0.5 mass-% to 1.5 mass-%, relative to the total mass of the plurality of (uncoated) core particles.

For the purposes of the present invention, the amount or total amount of carbonate ions present in the coating C2) is preferably determined by acid titration, coupled with mass spectroscopy, more preferably according to the method as defined in the examples section (see in particular example 4, below), preferably performed on a sample of the coated particulate material of the present invention.

Also preferred is a coated particulate material according to the present invention as defined herein (or a coated particulate material according to the present invention as described above or below as being preferred), wherein the coating C2) comprises lithium carbonate, preferably in a total amount in the range of from 0.1 mass-% to 2.5 mass-%, more preferably of from 0.15 mass-% to 2.0 mass-%, yet more preferably of from 0.15 mass-% to 1.5 mass-%, relative to the total mass of the plurality of (uncoated) core particles;
and/or
the molar ratio of lithium:E in the coating C2) is in the range of from 0.5 to 5.0, preferably of from 0.75 to 4.5, more preferably of from 1.0 to 4.0,
wherein E is selected from the group consisting of aluminium, boron, niobium, phosphorus, silicon, tantalum, titanium, zinc, zirconium and mixtures thereof,
wherein preferably E is selected from the group consisting of niobium, zirconium, and mixtures thereof,
wherein more preferably E is niobium.
and/or the molar amount of E in the coating C2) per g of the plurality of (uncoated) core particles is in the range of from 4 to 320 μmol/g, preferably of from 6 to 250 μmol/g, more preferably of from 6 to 190 μmol/g, wherein E is selected from the group consisting of aluminium, boron, niobium, phosphorus, silicon, tantalum, titanium, zinc, zirconium and mixtures thereof, wherein preferably E is selected from the group consisting of niobium, zirconium and mixtures thereof, wherein more preferably E is niobium.

For the purposes of calculating the molar ratio of "lithium:E" in the coating C2) of the coated particulate material of the present invention as defined above, the component "E" can stand for any individual member of the group of elements as defined above (e.g. the component "E" can stand for niobium, i.e. "Nb") or it can stand for two or more members of the group of elements as defined above (e.g. the component "E" can stand for a group consisting of niobium, tantalum and zirconium). Where the component "E" stands for two or more members of the group of metals as defined above, the molar ratio of lithium is calculated relative to the sum of molar amounts of all of the elements represented by the component "E".

For the purposes of the present invention, the amount or total amount of aluminium, boron, niobium, phosphorus, silicon, tantalum, titanium, zinc, zirconium and mixtures thereof, present in the coating C2) is preferably determined by inductively coupled plasma optical emission spectrometry ("ICP-OES"), preferably performed on the surface of a sample of the coated particulate material of the present invention. In cases where the total amount or amount of an element (or a mixture of elements) present in the coating C2) shall be determined where the particular element (or mixture of elements) is at the same time present in the core particles (or in the plurality of core particles) C1), the total amount or amount of the element (or the mixture of elements) present in the coating C2) is preferably determined by comparing the measuring results from (i) measuring (determining) the total amount or amount of the element (or the mixture of elements) present in the core particles (or in the plurality of core particles) C1) of a sample of said core particles (or in the plurality of core particles) C1) before coating (according to the process of the present invention) and (ii) measuring (determining) the total amount or amount of the element (or the mixture of elements) present in the core particles (or in the plurality of core particles) C1) of said same sample of said core particles (or the plurality of core particles) C1) after coating (according to the process of the present invention).

For the purposes of the present invention, the total mass (or molar amount) of lithium in the coating C2) is preferably determined (calculated) as follows: first, the molar amount (or mass) of carbonate anions present in the coating C2) is determined by acid titration, coupled with mass spectroscopy, as explained above. It is next assumed for calculation purposes of the present invention that the total molar amount (or mass) of carbonate ions found in the coating C2) is solely present as $Li_2CO_3$. It is then further assumed for calculation purposes of the present invention that further amounts of lithium in the coating are present, if one or more of the following other elements are present in the coating: aluminium (additional lithium is present as $LiAlO_2$), boron (additional lithium is present as $Li_3BO_3$), niobium (additional lithium is present as $LiNbO_3$), phosphorus (additional lithium is present as $Li_3PO_4$), silicon (additional lithium is present as $Li_2SiO_3$), tantalum (additional lithium is present as $LiTaO_3$), titanium (additional lithium is present as $Li_4Ti_5O_{12}$) and/or zirconium (additional lithium is present as $Li_2ZrO_3$).

A coated particulate material according to the present invention as defined above is preferred wherein the amounts, preferably the preferred amounts, of carbonate anions or of lithium carbonate present in the coating as defined above are combined with the molar ratios of lithium:E, preferably the preferred molar ratios of lithium:E, as defined above.

A coated particulate material according to the present invention as defined above is also preferred wherein the amounts, preferably the preferred amounts, of carbonate anions or of lithium carbonate present in the coating as defined above are combined with the molar amounts of E, preferably the preferred molar amounts of E, in the coating per g of the plurality of (uncoated) core particles, as defined above.

As is generally known in the field, the amount of carbonate ions present in the coating C2), more specifically the amount of lithium carbonate present in the coating C2), can e.g. be controlled by a variation of the molar ratio of lithium:E in the coating C2) (as explained above). E.g. the amount of carbonate ions present in the coating C2) will be increased when the molar ratio "lithium:E" will be increased, probably due to an increased formation of lithium carbonate in the coating during manufacture or storage of the coated particulate material of the present invention from lithium and sources of carbon and oxygen available in the environment surrounding the coated particulate material, e.g. carbon dioxide.

In one preferred variant of the present invention, the coated particulate material comprises C1) a plurality of core particles, each core particle comprising or consisting of at least one complex layered oxide, comprising or consisting of a compound of formula I and/or a compound of formula II and/or a compound of formula IIa (each as defined above), preferably comprising or consisting of a compound of formula II and/or a compound of formula IIa and C2) disposed on the surfaces of the core particles, a coating comprising carbonate anions in a total amount in the range of from 0.12 mass-% to 3.0 mass-%, preferably of from ≥0.15 mass-% to 2.5 mass-%, more preferably of from ≥0.15 to 2.0 mass-%, even more preferably of from ≥0.15 mass-% to 1.0 mass-%, relative to the total mass of the plurality of (uncoated) core particles;

lithium and at least one member of the group consisting of aluminium, boron, niobium, phosphorus, silicon, tantalum, titanium, zinc, zirconium and mixtures thereof, preferably at least one member of the group consisting of niobium, zirconium and mixtures thereof, wherein the molar amount of E in the coating C2) per g of the plurality of (uncoated) core particles is in the range of from 4 to 320 μmol/g, preferably of from 6 to 250 μmol/g, more preferably of from 6 to 190 μmol/g, wherein E is selected from the group consisting of aluminium, boron, niobium, phosphorus, silicon, tantalum, titanium, zinc, zirconium and mixtures thereof, wherein preferably the at least one member is selected from the group consisting of niobium, zirconium and mixtures thereof and E is a member selected from the group consisting of niobium, zirconium and mixtures thereof and the molar amount of E in the coating C2) per g of the plurality of (uncoated) core particles is in the range of from 30 to 150 μmol/g, preferably of from 50 to 100 μmol/g.

The present invention also pertains to an electrode for use in a solid-state lithium-ion electrochemical cell and/or in an all solid-state lithium-ion electrochemical cell, comprising E1) as electrode active material a coated particulate material according to the present invention as defined herein (or a coated particulate material according to the present invention as described above or below as being preferred), preferably in a total amount of from 50 mass-% to 99 mass-%, more preferably of from 70 mass-% to 97 mass-%, relative to the total mass of the electrode and E2) a solid electrolyte material comprising lithium, sulfur and phosphorus, preferably in a total amount of from 1 mass-% to 50 mass-%, more preferably of from 3 mass-% to 30 mass-%, relative to the total mass of the electrode.

All aspects of the present invention discussed herein in the context of the coated particulate material according to the invention as defined above apply mutatis mutandis to the electrode according to the invention, as defined here above and below, and vice versa.

Preferred is an electrode according to the present invention as defined above which is a cathode (at discharge) in a secondary lithium-ion battery.

The solid electrolyte material E2) comprising lithium, sulfur and phosphorus may e.g. be sulfide solid electrolyte materials (e.g. sulfide glasses and/or glass ceramics). Preferably, the solid electrolyte material E2) comprising lithium, sulfur and phosphorus is selected for the purposes of the present invention from the group consisting of $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$—$P_2S_5$—LiI, $Li_2S$—$P_2S_5$—$Z_mS_n$ (wherein m and n are positive numbers and Z is a member selected from the group consisting of germanium, gallium and zinc), $Li_2S$—$SiS_2$—$Li_3PO_4$, $Li_2S$—$SiS_2$—$Li_yPO_z$, (wherein y and z are positive numbers), $Li_7P_3S_{11}$, $Li_3PS_4$, $Li_{11}S_2PS_{12}$, $Li_7P_2S_8I$, and $Li_{7-r-2s}PS_{6-r-s}X_r$ (wherein X is one or more members of the group consisting of chlorine, bromine, iodine, fluorine, cyanide, cyanate, thiocyanate and azide, preferably wherein X is chlorine, bromine or iodine, r is a number in the range of from ≥0.8 to ≤1.7 and s is a number in the range of from ≥0 to ≤(−0.25 r)+0.5).

An electrode according to the present invention as defined herein (or an electrode according to the present invention as described above or below as being preferred) is preferred, wherein the or at least one solid electrolyte material E2)

is selected from the group consisting of a sulfide having a cubic crystal structure, preferably a cubic argyrodite crystal structure, more preferably having the formula III $$Li_{7-r-2s}PS_{6-r-s}X_r \qquad (III),$$

wherein

X is one or more members of the group consisting of chlorine, bromine, iodine, fluorine, cyanide, cyanate, thiocyanate and azide, preferably wherein X is chlorine, bromine or iodine, more preferably chlorine, r is a number in the range of from ≥0.8 to ≤1.7, preferably of from ≥1.0 to ≤1.4, and s is a number in the range of from ≥0 to ≤(−0.25 r)+0.5, preferably of from ≥0 to ≤(−0.2 r)+0.4;

wherein preferably the sulfide having a cubic crystal structure is selected from the group consisting of $Li_6PS_5Cl$, $Li_6PS_5Br$ and $Li_6PS_5I$;

$Li_3PS_4$, preferably orthorhombic β-$Li_3PS_4$, and mixtures thereof;

and/or has a lithium-ion conductivity at 25° C. of 0.15 mS/cm, preferably of 1.0 mS/cm, more preferably of ≥1.0 mS/cm.

For the purposes of the present invention, the lithium-ion conductivity of the at least one solid electrolyte material E2) is preferably determined (measured) by electrochemical impedance spectroscopy, as is common in the art.

In a particularly preferred variant of the electrode according to the invention, the or at least one solid electrolyte material E2) is a sulfide having a cubic crystal structure, preferably a cubic argyrodite crystal structure, and/or the or at least one solid electrolyte material E2) has the formula $Li_{7-r-2s}PS_{6-r-s}X_r$, (as defined as formula III above). It was found in own experiments that improved results for initial discharge capacities and/or for initial Coulombic efficiencies were obtained for a solid-state or all solid-state lithium-ion electrochemical cell comprising an electrode of the present invention wherein the coating of the coated particulate material comprised carbonate anions in a total amount of ≥0.12 mass-% relative to the total mass of the plurality of (uncoated) core particles and wherein the or at least one solid electrolyte material E2) was a sulfide having a cubic argyrodite crystal structure, preferably of the formula $Li_{7-r-2s}PS_{6-r-s}X_r$ (as defined as formula III above).

Said improved results were found for coated particulate materials comprising a relatively broad range of carbonate ion content in the coating, wherein the carbonate anions were present in the coating C2) of said coated particulate material in a total amount in the range of from ≥0.15 mass-% to 2.5 mass-%, preferably of from ≥0.15 to 2.0 mass-% and even more preferably of from ≥0.15 mass-% to 1.0 mass-%, relative to the total mass of the plurality of (uncoated) core particles C1).

In another particularly preferred variant of the electrode according to the invention, the or at least one solid electrolyte material E2) is a solid electrolyte material comprising lithium, sulfur and phosphorus with a lithium-ion conductivity at 25° C. of ≥0.1 mS/cm, preferably in the range of from ≥0.1 to ≤1 mS/cm, more preferably is or comprises $Li_3PS_4$, yet more preferably is or comprises orthorhombic β-$Li_3PS_4$.

It has been found in own experiments that a solid-state electrochemical cell comprising an electrode (cathode) comprising as electrode active material E1) a coated particulate material wherein the coating C2) comprises carbonate anions in a total amount in the range of from 0.12 mass-% to 1.0 mass-%, preferably of from 0.15 mass-% to 0.75 mass-%, relative to the total mass of the plurality of (uncoated) core particles and as solid electrolyte material E2) a solid electrolyte material comprising lithium, sulfur and phosphorus with a lithium-ion conductivity at 25° C. of ≥0.1 mS/cm, preferably in the range of from ≥0.1 to ≤1 mS/cm, more preferably representing or comprising $Li_3PS_4$, yet more preferably representing or comprising orthorhombic β-$Li_3PS_4$, showed particularly good properties of initial Coulombic efficiency and initial discharge capacity when compared with similar solid-state electrochemical cells wherein the electrodes (cathodes) had a different composition of the coating C2).

Also preferred is an electrode according to the present invention as defined herein (or an electrode according to the present invention as described above or below as being preferred), further comprising E3) electrically conductive carbon, preferably graphite, more preferably conductive carbon black.

In one preferred variant of the present invention, the electrode according to the present invention comprises E1) as electrode active material a coated particulate material comprising C1) a plurality of core particles, each core particle comprising or consisting of at least one complex layered oxide, comprising or consisting of a compound of formula I, preferably of a compound of formula II, more preferably of a compound of formula IIa (each as defined above), and C2) disposed on the surfaces of the core particles, a coating comprising carbonate anions in a total amount in the range of from 0.12 mass-% to 3.0 mass-%, preferably of from 0.15 mass-% to 2.5 mass-%, more preferably of from 0.15 to 2.0 mass-%, even more preferably of from ≥0.15 mass-% to 1.0 mass-% and yet even more preferably of from ≥0.15 mass-% to 0.75 mass-%, relative to the total mass of the plurality of (uncoated) core particles;

lithium and at least one member of the group consisting of aluminium, boron, niobium, phosphorus, silicon, tantalum, titanium, zinc, zirconium and mixtures thereof.

wherein the molar amount of E in the coating C2) per g of the plurality of (uncoated) core particles is in the range of from 4 to 320 $\mu$mol/g, preferably of from 6 to 250 $\mu$mol/g, more preferably of from 6 to 190 $\mu$mol/g, wherein E is selected from the group consisting of aluminium, boron, niobium, phosphorus, silicon, tantalum, titanium, zinc, zirconium and mixtures thereof, wherein preferably the at least one member is selected from the group consisting of niobium, zirconium and mixtures thereof and E is a member selected from the group consisting of niobium, zirconium and mixtures thereof and the molar amount of E in the coating C2) per g of the plurality of (uncoated) core particles is in the range of from 30 to 150 $\mu$mol/g, preferably of from 50 to 100 $\mu$mol/g.

preferably in a total amount of from 50 mass-% to 99 mass-%, more preferably of from 70 mass-% to 97 mass-%, relative to the total mass of the electrode and E2) a solid electrolyte material comprising lithium, sulfur and phosphorus, with a lithium-ion conductivity at 25° C. of ≥0.1 mS/cm, preferably in the range of from ≥0.1 to ≤1 mS/cm, more preferably representing or comprising $Li_3PS_4$, yet more preferably representing or comprising orthorhombic $\beta$-$Li_3PS_4$, preferably in a total amount of from 1 mass-% to 50 mass-%, more preferably of from 3 mass-% to 30 mass-%, relative to the total mass of the electrode.

The present invention further pertains to an electrochemical cell, comprising (i.e. one or more additional components may be present)

a coated particulate material according to the present invention as defined herein (or a coated particulate material according to the present invention as described above or below as being preferred), and/or an electrode according to the present invention as defined herein (or an electrode according to the present invention as described above or below as being preferred)

All aspects of the present invention discussed herein in the context of the coated particulate material according to the invention as defined above and/or of the electrode according to the invention as defined above apply mutatis mutandis to the electrochemical cell according to the invention, as defined here above and below, and vice versa.

An electrochemical cell according to the present invention as defined above is preferred, further comprising a solid electrolyte material comprising lithium, sulfur and phosphorus as defined herein (or a solid electrolyte material comprising lithium, sulfur and phosphorus as described above or below as being preferred).

The present invention further pertains to a method of making a coated particulate material, preferably a coated particulate material according to the present invention (or a coated particulate material according to the present invention as described above or below as being preferred), comprising the steps M1) preparing or providing a plurality of particles of at least one complex layered oxide comprising lithium, nickel and one or both members of the group consisting of cobalt and manganese, wherein preferably the at least one complex layered oxide is as defined above (or is as defined above as being preferred), M2) preparing or providing a liquid composition comprising a solvent and, at least partially dissolved in said solvent, lithium-ions, M3) preparing or providing a liquid composition comprising a solvent and, at least partially dissolved in said solvent, at least one member selected from the group consisting of aluminium ions, boron ions, niobium ions, phosphorus ions, silicon ions, tantalum ions, titanium ions, zinc ions, zirconium ions, and mixtures thereof, wherein preferably the liquid composition comprises a solvent and, at least partially dissolved in said solvent, at least one member selected from the group consisting of boron ions, niobium ions, tantalum ions, zirconium ions, and mixtures thereof, wherein more preferably the liquid composition comprises an organic solvent and, at least partially dissolved in said organic solvent, at least one member selected from the group consisting of niobium ions, zirconium ions and mixtures thereof;

M4) contacting the components from steps M1) to M3) with each other,

M5) drying the contacted components from step M4)

and

M6) heating, preferably calcining, the contacted and dried components from step M5) at a temperature in the range of from 200° C. to 400° C., preferably of from 250° C. to 350° C., preferably in the presence of carbon dioxide, so that a coated particulate material, preferably a coated particulate material according to the present invention (or a coated particulate material according to the present invention as described above or below as being preferred), results.

All aspects of the present invention discussed herein in the context of the coated particulate material according to the invention, of the electrode according to the invention and/or of the electrochemical cell according to the invention apply mutatis mutandis to the method of making a coated particulate material according to the invention, as defined here above and below, and vice versa.

The solvent used in step M2) and/or in step M3) of the method of making a coated particulate material as defined above may be organic, e.g. an alcohol comprising 1 to 3 carbon atoms, or it may be water or it may be a mixture of one or more of said organic solvents with water. A preferred solvent for use in step M2) and/or M3) is an alcohol comprising 1 to 3 carbon atoms, more preferably ethanol. Another preferred solvent for use in step M2) and/or M3) is a mixture of ethanol with water.

In step M3) of the method of making a coated particulate material as defined above, the ions which are at least partially dissolved in the solvent comprise any ions which comprise the elements as defined above (e.g. ions comprising aluminium) and which are suited for the defined purpose, in particular oxo-(an)ions, e.g. phosphate ions and/or zirconyl ions, as is known in the art.

In step M4) of the method of making a coated particulate material as defined above, the components can be contacted in different ways, e.g. by mixing and/or spraying. For enhanced or completed contact, e.g. for finalizing the preparation of a mixture or a gel, sonicating may be used, preferably at a temperature in the range of from 15° C. to 30° C. and for a time period in the range of from 15 min to 60 min.

The present invention also pertains to a coated particulate material, obtainable by a method of making a coated particulate material according to the present invention, as defined above.

All aspects of the present invention discussed herein in the context of the method of making a coated particulate material according to the invention, of the coated particulate material according to the invention, of the electrode according to the invention and/or of the electrochemical cell according to the invention apply mutatis mutandis to the coated particulate material, obtainable by a method of making a coated particulate material according to the present invention as defined here above and below, and vice versa.

The present invention also pertains to a method of making an electrode for use in a solid-state lithium-ion electrochemical cell and/or in an all solid-state lithium-ion electrochemical cell, preferably an electrode according to the present invention as defined herein (or an electrode according to the present invention as described above or below as being preferred), comprising the steps M6a) preparing or providing at least one coated particulate material according to the present invention (or a coated particulate material according to the present invention as described above or below as being preferred), preferably preparing said at least one coated particulate material according to the method of making a coated particulate material according to the present invention as defined above (i.e. by performing steps M1) to M6) as defined above), or a reaction product thereof, M7) preparing or providing at least one solid electrolyte material comprising lithium, sulfur and phosphorus, preferably as defined above, or a preferred solid electrolyte material comprising lithium, sulfur and phosphorus as defined above, preferably in particulate form, M8) mechanically mixing the components from steps M6a) (or from step M6)) and M7) and optionally further components with each other and M9) compressing the mixed components from step M8) at a pressure above atmospheric pressure, preferably so that an electrode results, preferably an electrode according to the present invention as defined herein (or an electrode according to the present invention as described above or below as being preferred).

All aspects of the present invention discussed herein in the context of the coated particulate material, obtainable by a method of making a coated particulate material according to the present invention, the method of making a coated particulate material according to the invention, of the coated particulate material according to the invention, of the electrode according to the invention and/or of the electrochemical cell according to the invention apply mutatis mutandis to the method of making an electrode for use in a solid-state lithium-ion electrochemical cell and/or in an all solid-state lithium-ion electrochemical cell according to the present invention as defined here above and below, and vice versa.

In step M8) of the method of making an electrode for use in a solid-state lithium-ion electrochemical cell and/or in an all solid-state lithium-ion electrochemical cell according to the present invention as defined above, further components comprise electrically conductive carbon, preferably graphite, more preferably conductive carbon black.

In step M9) of the method of making an electrode for use in a solid-state lithium-ion electrochemical cell and/or in an all solid-state lithium-ion electrochemical cell according to the present invention as defined above, the pressure above atmospheric pressure is preferably a pressure in the range of from 1 to 450 MPa, more preferably of from 50 to 450 MPa and yet more preferably of from 75 to 400 MPa.

The present invention also pertains to an electrode, obtainable by a method of making an electrode for use in a solid-state lithium-ion electrochemical cell and/or in an all solid-state lithium-ion electrochemical cell according to the present invention, as defined above.

All aspects of the present invention discussed herein in the context of the method of making an electrode for use in a solid-state lithium-ion electrochemical cell and/or in an all solid-state lithium-ion electrochemical cell, the coated particulate material, obtainable by a method of making a coated particulate material according to the present invention, the method of making a coated particulate material according to the invention, of the coated particulate material according to the invention, of the electrode according to the invention and/or of the electrochemical cell according to the invention apply mutatis mutandis to the electrode, obtainable by a method of making an electrode for use in a solid-state lithium-ion electrochemical cell and/or in an all solid-state lithium-ion electrochemical cell according to the present invention as defined here above and below, and vice versa.

The present invention also pertains to the use of a coated particulate material according to the present invention as defined herein (or of a coated particulate material according to the present invention as described above or below as being preferred)

as electrode active material in an electrode, preferably a cathode, comprising a solid electrolyte material comprising lithium, sulfur and phosphorus, wherein preferably the solid electrolyte material comprising lithium, sulfur and phosphorus is selected from the group consisting of a sulfide having a cubic crystal structure, preferably a cubic argyrodite crystal structure, more preferably having the formula $Li_{7-r-2s}PS_{6-r-s}X_r$ (as defined as formula III above, or a preferred compound of formula III, as defined above);

$Li_3PS_4$, preferably orthorhombic $\beta$-$Li_3PS_4$, and mixtures thereof, wherein more preferably the solid electrolyte material comprising lithium, sulfur and phosphorus is or comprises $Li_3PS_4$, preferably orthorhombic $\beta$-$Li_3PS_4$, and/or as electrode active material in an electrode, preferably a cathode, comprising a solid electrolyte material comprising lithium, sulfur and phosphorus, preferably with a lithium-ion conductivity at 25° C. of ≥0.1 mS/cm preferably in the range of from ≥0.1 to ≤1 mS/cm, more preferably representing or comprising $Li_3PS_4$, even more preferably representing or comprising orthorhombic $\beta$-$Li_3PS_4$, and/or as electrode active material in an electrode, preferably a cathode, according to the present invention (or in an electrode according to the present invention as defined above or below as being preferred), and/or in a method of making an electrode, preferably a cathode, preferably comprising a solid electrolyte material comprising lithium, sulfur and phosphorus, more preferably in a method of making an electrode according to the present invention as defined above, and/or as component of a solid-state lithium-ion electrochemical cell and/or of an all solid-state lithium-ion electrochemical cell.

For the purposes of the present invention and consistent with the common understanding in the technical field, a cathode is a positive electrode (at discharge) of an electrochemical cell.

All aspects of the present invention discussed herein in the context of the electrode, obtainable by a method of making an electrode for use in a solid-state lithium-ion electrochemical cell and/or in an all solid-state lithium-ion electrochemical cell, the method of making an electrode for use in a solid-state lithium-ion electrochemical cell and/or in an all solid-state lithium-ion electrochemical cell, the coated particulate material, obtainable by a method of making a coated particulate material according to the present invention, the method of making a coated particulate material according to the invention, of the coated particulate material according to the invention, of the electrode according to the invention and/or of the electrochemical cell according to the invention apply mutatis mutandis to the use of the coated particulate material according to the present invention as defined here above, and vice versa.

The present invention is, or variants thereof are, also summarized and defined in the following aspects A1 to A15:

A1. Coated particulate material for use as electrode active material in an electrode and/or in a solid-state lithium-ion electrochemical cell and/or in an all solid-state lithium-ion electrochemical cell, comprising or consisting of C1) a plurality of core particles, each core particle comprising or consisting of at least one complex layered oxide comprising lithium, nickel and one or both members of the group consisting of cobalt and manganese, and C2) disposed on the surfaces of the core particles, a coating comprising carbonate anions, lithium and at least one member of the group consisting of aluminium, boron, niobium, phosphorus, silicon, tantalum, titanium, zinc, zirconium and mixtures thereof.

A2. Coated particulate material according to aspect A1, wherein the at least one complex layered oxide of the plurality of core particles further comprises at least one member of the group consisting of aluminium, barium, boron, magnesium, molybdenum, titanium, tungsten, zirconium and mixtures thereof, and/or is or comprises a compound of formula I:

$$Li_{1+t}A_{1-t}O_2 \qquad (I),$$

wherein

A comprises nickel and preferably further comprises one or both members of the group consisting of cobalt and manganese, at least one element selected from the group consisting of aluminium, barium, boron and magnesium and one or more transition metals not selected from the group consisting of nickel, cobalt and manganese, wherein at least 50 mole-% of the transition metal of A is nickel, and t is a number in the range of from −0.05 to 0.2.

A3. Coated particulate material according to any of the preceding aspects, preferably according to claim 1, wherein the at least one complex layered oxide of the plurality of core particles is or comprises a compound of formula II $$Li_{1+x}[Ni_{1-u-v-w}Co_uMn_vM_w]_{1-x}O_2 \qquad (II),$$

wherein

M is a member of the group consisting of aluminium, barium, boron, magnesium, molybdenum, titanium, tungsten, zirconium, and mixtures of at least two of the foregoing elements, x is a number in the range of from −0.05 to 0.2, u is a number in the range of from 0.04 to 0.2, v is a number in the range of from 0 to 0.2, w is a number in the range of from 0 to 0.1 and (u+v+w) is ≤0.4 and preferably is ≤0.3.

A4. Coated particulate material according to any of the preceding aspects, wherein the at least one complex layered oxide of the core particles
is or comprises a compound of formula IIa $$Li_{1+x}[Ni_{1-u-v}Co_uMn_v]_{1-x}O_2 \qquad (IIa),$$

wherein
x and u have the meanings as defined in claim 3,
v is a number in the range of from 0.04 to 0.2
and
(u+v) is ≤0.4, preferably is ≤0.3;
and/or
comprises a crystallographic unit cell of space group R3m.

A5. Coated particulate material according to any of the preceding aspects,
wherein the coating comprises
carbonate anions in a total amount of 0.12 mass-%, preferably of 0.15 mass-%, relative to the total mass of the plurality of core particles;
and/or
carbonate anions in a total amount in the range of from 0.12 mass-% to 3.0 mass-%, preferably of from 0.15 mass-% to 2.5 mass-%, more preferably of from 0.15 to 2.0 mass-% and even more preferably of from 0.15 mass-% to 1.0 mass-%, relative to the total mass of the plurality of core particles;
and/or
at least one member of the group consisting of boron, niobium, tantalum, zirconium and mixtures thereof,
wherein preferably the coating comprises at least one member of the group consisting of niobium, zirconium and mixtures thereof,
wherein more preferably the or at least one member of the group is niobium.

A6. Coated particulate material according to any of the preceding aspects, wherein
at least a part of the carbonate ions, preferably the total amount of carbonate ions, present in the coating are present as lithium carbonate;
and/or
the coating comprises at least one member of the group consisting of $LiNbO_3$, $Li_2ZrO_3$ and mixtures thereof, preferably in a total amount in the range of from 0.1 mass-% to 3.0 mass-%, more preferably of from 0.2 mass-% to 2.5 mass %, yet more preferably of from 0.5 mass-% to 1.5 mass-%, relative to the total mass of the plurality of core particles.

A7. Coated particulate material according to any of the preceding aspects, wherein
the coating comprises lithium carbonate, preferably in a total amount in the range of from 0.1 mass-% to 2.5 mass-%, more preferably of from 0.15 mass % to 2.0 mass-%, yet more preferably of from 0.15 mass-% to 1.5 mass-%, relative to the total mass of the plurality of core particles;
and/or
the molar ratio of lithium:E in the coating is in the range of from 0.5 to 5.0, preferably of from 0.75 to 4.5, more preferably of from 1.0 to 4.0, wherein E is selected from the group consisting of aluminium, boron, niobium, phosphorus, silicon, tantalum, titanium, zinc, zirconium and mixtures thereof,
wherein preferably E is selected from the group consisting of niobium, zirconium and mixtures thereof,
wherein more preferably E is niobium.

and/or
the molar amount of E in the coating per g of the plurality of (uncoated) core particles is in the range of from 4 to 320 μmol/g, preferably of from 6 to 250 μmol/g, more preferably of from 6 to 190 μmol/g, wherein E is selected from the group consisting of aluminium, boron, niobium, phosphorus, silicon, tantalum, titanium, zinc, zirconium and mixtures thereof,
wherein preferably E is selected from the group consisting of niobium, zirconium and mixtures thereof,
wherein more preferably E is niobium.

A8. Electrode for use in a solid-state lithium-ion electrochemical cell and/or in an all solid-state lithium-ion electrochemical cell, comprising
E1) as electrode active material a coated particulate material as defined in any of aspects A1 to A7, preferably in a total amount of from 50 mass-% to 99 mass %, more preferably of from 70 mass-% to 97 mass-%, relative to the total mass of the electrode,
E2) a solid electrolyte material comprising lithium, sulfur and phosphorus, preferably in a total amount of from 1 mass-% to 50 mass-%, more preferably of from 3 mass-% to 30 mass-%, relative to the total mass of the electrode,
and preferably
E3) electrically conductive carbon, preferably graphite, more preferably conductive carbon black.

A9. Electrode according to aspect A8, wherein the or at least one solid electrolyte material E2)
is selected from the group consisting of
a sulfide having a cubic crystal structure, preferably a cubic argyrodite crystal structure, more preferably having the formula III $$Li_{7-r-2s}PS_{6-r-s}X_r \qquad (III),$$

wherein
X is chlorine, bromine or iodine, preferably chlorine;
r is a number in the range of from ≥0.8 to ≤1.7, preferably of from ≥1.0 to ≤1.4
and
s is a number in the range of from ≥0 to ≤(−0.25 r)+0.5, preferably of from ≥0 to ≤(−0.2 r)+0.4;
$Li_3PS_4$, preferably orthorhombic β-$Li_3PS_4$,
and
mixtures thereof;
and/or
has a lithium-ion conductivity at 25° C. of ≥0.15 mS/cm, preferably of 1.0 mS/cm, more preferably of >1.0 mS/cm.

A10. Electrochemical cell, comprising a coated particulate material according to any of aspects A1 to A7 and/or an electrode according to any of aspects A8 to A9.

A11. Method of making a coated particulate material, preferably according to any of aspects A1 to A7, comprising the steps
M1) preparing or providing a plurality of particles of at least one complex layered oxide comprising lithium, nickel and one or both members of the group consisting of cobalt and manganese,
M2) preparing or providing a liquid composition comprising a solvent and, at least partially dissolved in said solvent, lithium-ions,
M3) preparing or providing a liquid composition comprising a solvent and, at least partially dissolved in said solvent, at least one member selected from the group consisting of aluminium ions, boron ions, niobium ions, phosphorus ions, silicon ions, tantalum ions, titanium ions, zinc ions, zirconium ions, and mixtures thereof, wherein preferably the liquid composition comprises a solvent and, at least partially dissolved in said solvent, at least one member selected from the group consisting of boron ions, niobium ions, tantalum ions, zirconium ions, and mixtures thereof, wherein more preferably the liquid composition comprises an organic solvent and, at least partially dissolved in said organic solvent, at least one member selected from the group consisting of niobium ions, zirconium ions and mixtures thereof;

M4) contacting the components from steps M1) to M3) with each other,

M5) drying the contacted components from step M4) and

M6) heating, preferably calcining, the contacted and dried components from step M5) at a temperature in the range of from 200° C. to 400° C., preferably of from 250° C. to 350° C., preferably in the presence of carbon dioxide, so that a coated particulate material, preferably according to any of aspects A1 to A7, results.

A12. Coated particulate material, obtainable by a method according to aspect A11.

A13. Method of making an electrode for use in a solid-state lithium-ion electrochemical cell and/or in an all solid-state lithium-ion electrochemical cell, preferably according to any of aspects A8 to A9, comprising the steps M6a) preparing or providing at least one coated particulate material according to any of aspects A1 to A7, preferably preparing said at least one coated particulate material according to the method of aspect A11, or a reaction product thereof, M7) preparing or providing at least one solid electrolyte material comprising lithium, sulfur and phosphorus, preferably as defined in any of aspects A8 to A9, preferably in particulate form, M8) mechanically mixing the components from steps M6a), or from step M6), and M7) and optionally further components with each other and M9) compressing the mixed components from step M8) at a pressure above atmospheric pressure, preferably so that an electrode results, preferably an electrode according to any of aspects A8 to A9.

A14. Electrode, obtainable by a method according to aspect A13.

A15. Use of a coated particulate material according to any of aspects A1 to A7, as electrode active material in an electrode comprising a solid electrolyte material comprising lithium, sulfur and phosphorus, and/or as electrode active material in an electrode as defined in any of aspects A8 to A9, and/or in a method of making an electrode, preferably a cathode, preferably in a method of making an electrode according to aspect A11, and/or as component of a solid-state lithium-ion electrochemical cell and/or of an all solid-state lithium-ion electrochemical cell.

EXAMPLES

The following examples are meant to further explain and illustrate the present invention without limiting its scope.

Example 1: Preparation of Reagents 1.1 A sample of $LiNi_{0.6}Co_{0.2}Mn_{0.2}O_2$-powder (referred to as "NCM622" commercially available from BASF SE) was dried under vacuum at 300° C. for 12 hours and stored in a glove-box under argon atmosphere (content of oxygen and water of the dried powder<0.1 ppm). The dried powder (referred to as "core particles of complex layered oxide NCM622" hereinafter) was used as plurality of core particles (C1)), each core particle comprising or consisting of at least one complex layered oxide comprising lithium, nickel, cobalt and manganese according to the present invention.

1.2 A sample of $LiNi_{0.85}Co_{0.1}Mn_{0.05}O_2$-powder (referred to as "NCM851005") was stored in a glove-box under argon atmosphere (content of oxygen and water of the dried powder<0.1 ppm). The dried powder (referred to as "core particles of complex layered oxide NCM851005" hereinafter) was used as plurality of core particles (C1)), each core particle comprising or consisting of at least one complex layered oxide comprising lithium, nickel, cobalt and manganese according to the present invention.

1.3 A lithium ethoxide solution ($CH_3CH_2OLi$; 1 mole/L with regard to lithium) was prepared from lithium metal and dry ethanol (water content 6 ppm).

1.4 A niobium ethoxide solution ($Nb(OCH_2CH_3)_5$; 0.5 mole/L with regard to niobium) was prepared from niobium ethoxide (99.95%, Sigma-Aldrich) and absolute ethanol.

Example 2: Preparation of Coated Particulate Materials

If not stated otherwise, all synthesis steps were performed under argon atmosphere.

The following preparations were made by combining the constituents as described in the protocols shown below:

Preparation 1: 5.94 g of core particles of complex layered oxide NCM622 (from example 1.1); 812 μl of 0.5 mole/L niobium ethoxide solution (from example 1.4) and 203 μl of 1 mole/L lithium ethoxide solution (from example 1.3).

Preparation 2: 5.94 g of core particles of complex layered oxide NCM622 (from example 1.1); 812 μl of 0.5 mole/L niobium ethoxide solution (from example 1.4) and 304 μl of 1 mole/L lithium ethoxide solution (from example 1.3).

Preparation 3: 5.94 g of core particles of complex layered oxide NCM622 (from example 1.1); 812 μl of 0.5 mole/L niobium ethoxide solution (from example 1.4) and 406 μl of 1 mole/L lithium ethoxide solution (from example 1.3).

Preparation 4: 5.94 g of core particles of complex layered oxide NCM622 (from example 1.1); 812 μl of 0.5 mole/L niobium ethoxide solution (from example 1.4) and 812 μl of 1 mole/L lithium ethoxide solution (from example 1.3).

Preparation 5: 5.94 g of core particles of complex layered oxide NCM622 (from example 1.1); 812 μl of 0.5 mole/L niobium ethoxide solution (from example 1.4) and 1218 μl of 1 mole/L lithium ethoxide solution (from example 1.3).

Preparation 6: 5.94 g of core particles of complex layered oxide NCM851005 (from example 1.2); 812 μl of 0.5 mole/L niobium ethoxide solution (from example 1.4) and 812 μl of 1 mole/L lithium ethoxide solution (from example 1.3).

Preparations 1 to 6 were then mixed and sonicated for 30 min at 25° C. in an ultrasonic bath to form a gel in each case. The resulting slurry-like solutions from preparations 1 to 6 were dried overnight under vacuum until the solvent was in each case completely evaporated.

The dried powders from Preparations 1 to 5 were then ground using an agate mortar and subsequently calcined in air atmosphere at 300° C. for 2 hours (at a heating rate of 5° C./min) using a tube quartz furnace. The calcined powders from Preparations 1 to 5 were then stored under argon atmosphere and labelled as "Sample 1" to "Sample 5".

The dried powder from Preparation 6 was then calcined in oxygen atmosphere at 300° C. for 2 hours (at a heating rate of 5° C./min) using a tube quartz furnace. The calcined powder from Preparation 6 was then stored under argon atmosphere and labelled as "Sample 6".

A dried powder from a further Preparation 3 was also ground using an agate mortar, but subsequently calcined in an oxygen atmosphere at 300° C. for 2 hours (at a heating rate of 5° C./min) using a tube quartz furnace. The calcined powder from this Preparation was then stored under argon atmosphere and labelled as "Sample 7".

Example 3: IR Analysis of Coated Particulate Materials

Samples 1 to 7 (for preparation see example 2) were analysed (on their surfaces) by attenuated total reflection infrared spectroscopy (ATR-IR) on a BRUKER ALPHA FT-IR spectrometer, equipped with a germanium crystal in a glove box under argon atmosphere. The spectra were collected using the OPUS software (by BRUKER).

The presence of carbonate ions in the coatings of Samples 1 to 7 could be confirmed by this IR analysis method and the absorption bands associated with the vibration modes of lithium carbonate could be observed in the spectra. As expected, the intensities of the absorption bands increased with increasing amounts of lithium ethoxide solution used to prepare the Samples (see example 2).

Example 4: Determination of Carbonate Amount in the Coatings of Coated Particulate Materials The amount of carbonate present in the coatings of the coated particulate materials of Samples 1 to 7 (for preparation see example 2, above) and of a reference "Sample 0" (equivalent to an untreated sample of core particles of complex layered oxide, for preparation see example 1) was determined using acid titration, coupled with mass spectrometry using a HiBube Pro mass spectrometer with PrismaPlus® detector and Bronkhorst® mass flow controller F-201CV 020 RAD 22 Z. The flow rate of the carrier gas was 2.5 mL/min.

Samples 0 to 7 were placed in septum sealed vials (about 10 mg per Sample) and $H_2SO_4$ (1 mole/L) was injected into the vials through the septum with a needle (about 0.35 mL per Sample). The amount of carbon dioxide (both $^{12}CO_2$ and $^{13}CO_2$ were measured, by monitoring peaks at m/z=44 and m/z=45) formed from the acid titration was quantitatively measured by mass spectrometry. For quantification of the amounts of carbon dioxide, calibration gas was flown through the system after each run.

The content of carbonate or lithium carbonate (for the purposes of the present invention it was assumed that the total amount of carbonate found in the coating of a coated particulate material of the invention was present in the coating as lithium carbonate), respectively, found in the coatings of Samples 0 to 7 by the method of this example 4 is shown in table 1 below:

TABLE 1

| | Carbonate and lithium carbonate contents in coatings of coated particulate materials | |
|---|---|---|
| Sample | Content of carbonate (mass-%, relative to total mass of core particles of complex layered oxide) | Content of lithium carbonate (mass-%, relative to total mass of core particles of complex layered oxide) |
| 0 | 0.07 | 0.09 |
| 1 | 0.17 | 0.21 |
| 2 | 0.24 | 0.30 |
| 3 | 0.39 | 0.48 |
| 4 | 0.60 | 0.74 |
| 5 | 0.78 | 0.96 |
| 6 | 0.64 | 0.78 |
| 7 | 0.14 | 0.17 |

Example 5: Determination of Amount of Niobium in the Coating of Coated Particulate Materials The amount of niobium present in the coatings of the coated particulate materials of Samples 1 to 7 (or preparation see example 2, above) and of a reference "Sample 0" (equivalent to a sample of core particles of complex layered oxide, for preparation see example 1) was determined using inductively coupled plasma optical emission spectrometry ("ICP-OES") (PERKIN-ELMER OPTIMA 4300 DV).

The content of niobium (or lithium niobate: for the purposes of the present invention it was assumed that the total amount of niobium found in the coating of a coated particulate material of the invention was present in the coating as lithium niobate), respectively, found in the coatings of Samples 0 to 7 by the method of this example 5 is shown in table 2 below:

TABLE 2

| | Niobium contents in coatings of coated particulate materials | | |
|---|---|---|---|
| Sample | Content of niobium (mass-%, relative to total mass of core particles of complex layered oxide) | Content of niobium (μmole/g of core particles of complex layered oxide) | Content of lithium niobate (mass-%, relative to total mass of core particles of complex layered oxide) |
| 0 | ≤0.015 | n.a. | n.a. |
| 1 | 0.60 | 65.1 | 0.96 |
| 2 | 0.61 | 65.9 | 0.97 |
| 3 | 0.61 | 65.8 | 0.97 |
| 4 | 0.60 | 64.4 | 0.95 |
| 5 | 0.63 | 68.3 | 1.01 |
| 6 | 0.54 | 58.1 | 0.86 |
| 7 | 0.61 | 65.4 | 0.97 | n.a.: not applicable (no data provided)

From the results of example 4 and of example 5, the molar ratio of lithium:niobium was calculated in each case. The results of these calculations are shown in table 3 below:

TABLE 3

| | Molar ratios of lithium:niobium contents in coatings of coated particulate materials | |
| --- | --- | --- |
| Sample | Molar ratio of lithium:niobium | |
| 0 | n.a. | |
| 1 | 1.9:1 | |
| 2 | 2.2:1 | |
| 3 | 3:1 | |
| 4 | 4.1:1 | |
| 5 | 4.8:1 | |
| 6 | 4.7:1 | |
| 7 | 1.7:1 | | n.a.: not applicable (no data provided)

Example 6: Preparation of Electrodes for Use in a Solid-State or all-Solid-State Lithium-Ion Electrochemical Cell From the Samples 0 to 7 (for preparation see example 2 above), electrodes for use in a solid-state lithium-ion electrochemical cell were prepared as follows:

Cathode Preparations:

1 g per Sample was mechanically mixed with a solid electrolyte comprising lithium, phosphorus and sulfur (see table 4 for details) and electrically conductive carbon (Super C65, commercially available from Timcal Graphite & Carbon; as specified in table 4) in the amounts specified in table 4, using 10 zirconia balls in a planetary mill at 140 rpm for 30 min under an argon atmosphere.

Anode Preparations:

For preparation of anodes, carbon-coated $Li_4Ti_5O_{12}$ (abbreviated to "$Li_4Ti_5O_{12}$ (cc)", commercially available from BASF SE) was mechanically mixed with a solid electrolyte comprising lithium, phosphorus and sulfur (see table 5 for details) and electrically conductive carbon (as specified in table 5) in the amounts specified in table 5, using 10 zirconia balls in a planetary mill at 140 rpm for 30 min under an argon atmosphere.

TABLE 4

| Cathode No. | Cathode preparations for use in solid-state or all-solid-state lithium-ion electrochemical cells | | | |
| --- | --- | --- | --- | --- |
| | Sample used for cathode (A) | Solid electrolyte used for cathode (B) | Electrically conductive carbon (C) | Mass Ratio (A):(B):(C) |
| Cathode 1 | Sample 0 | $\beta$-$Li_3PS_4$ | None | 7:3:0 |
| Cathode 2 | Sample 1 | $\beta$-$Li_3PS_4$ | None | 7:3:0 |
| Cathode 3 | Sample 2 | $\beta$-$Li_3PS_4$ | None | 7:3:0 |
| Cathode 4 | Sample 3 | $\beta$-$Li_3PS_4$ | None | 7:3:0 |
| Cathode 5 | Sample 4 | $\beta$-$Li_3PS_4$ | None | 7:3:0 |
| Cathode 6 | Sample 5 | $\beta$-$Li_3PS_4$ | None | 7:3:0 |
| Cathode 7 | Sample 7 | $\beta$-$Li_3PS_4$ | None | 7:3:0 |
| Cathode 11 | Sample 0 | $\beta$-$Li_3PS_4$ | Super C65 | 70:29:1 |
| Cathode 12 | Sample 1 | $\beta$-$Li_3PS_4$ | Super C65 | 70:29:1 |
| Cathode 13 | Sample 2 | $\beta$-$Li_3PS_4$ | Super C65 | 70:29:1 |
| Cathode 14 | Sample 3 | $\beta$-$Li_3PS_4$ | Super C65 | 70:29:1 |
| Cathode 15 | Sample 4 | $\beta$-$Li_3PS_4$ | Super C65 | 70:29:1 |
| Cathode 16 | Sample 5 | $\beta$-$Li_3PS_4$ | Super C65 | 70:29:1 |
| Cathode 17 | Sample 7 | $\beta$-$Li_3PS_4$ | Super C65 | 70:29:1 |
| Cathode 21 | Sample 0 | $Li_6PS_5Cl$ | Super C65 | 70:29:1 |
| Cathode 22 | Sample 1 | $Li_6PS_5Cl$ | Super C65 | 70:29:1 |
| Cathode 23 | Sample 2 | $Li_6PS_5Cl$ | Super C65 | 70:29:1 |
| Cathode 24 | Sample 3 | $Li_6PS_5Cl$ | Super C65 | 70:29:1 |
| Cathode 25 | Sample 4 | $Li_6PS_5Cl$ | Super C65 | 70:29:1 |
| Cathode 26 | Sample 5 | $Li_6PS_5Cl$ | Super C65 | 70:29:1 |
| Cathode 27 | Sample 6 | $Li_6PS_5Cl$ | Super C65 | 70:29:1 |
| Cathode 28 | Sample 7 | $Li_6PS_5Cl$ | Super C65 | 70:29:1 |

$\beta$-$Li_3PS_4$: Orthorhombic $\beta$-$Li_3PS_4$

TABLE 5

| Anode No. | Anode preparations for use in solid-state or all-solid-state lithium-ion electrochemical cells | | | |
| --- | --- | --- | --- | --- |
| | Anode material used (D) | Solid electrolyte used for anode (E) | Electrically conductive carbon (F) | Mass Ratio (D):(E):(F) |
| Anode 1-7 | $Li_4Ti_5O_{12}$ (cc) | $\beta$-$Li_3PS_4$ | Super C65 | 3:6:1 |
| Anode 11-17 | $Li_4Ti_5O_{12}$ (cc) | $\beta$-$Li_3PS_4$ | Super C65 | 3:6:1 |
| Anode 21-28 | $Li_4Ti_5O_{12}$ (cc) | $Li_6PS_5Cl$ | Super C65 | 3:6:1 |

Example 7: Preparation of Solid-State and all-Solid-State Lithium-Ion Electrochemical Cells For preparation of solid-state electrochemical cells (SSEC) 1 to 7, 60 mg of $\beta$-$Li_3PS_4$ (each) was compressed at a pressure of 125 MPa, then 30 mg of anode composition (Anode 1 to 7, see table 5, above) was pressed to the solid electrolyte pellet at a pressure of 125 MPa (resulting in an anode of about 120 μm thickness in each case) and 10 to 11 mg of cathode composition (Cathode 1 to 7, see table 4, above) was pressed onto the other side of the solid electrolyte pellet (opposite the anode composition) at a pressure of 375 MPa (resulting in a cathode of about 90 μm thickness in each case).

For preparation of solid-state electrochemical cells (SSEC) 11 to 17, 60 mg of $\beta$-$Li_3PS_4$ was compressed at a pressure of 125 MPa, then 30 mg of anode composition (Anode 11 to 17, see table 5, above) was pressed to the solid electrolyte pellet at a pressure of 125 MPa (resulting in an anode of about 120 μm thickness in each case) and 10 to 11 mg of cathode composition (Cathode 11 to 17, see table 4, above) was pressed onto the other side of the solid electrolyte pellet (opposite the anode composition) at a pressure of 375 MPa (resulting in a cathode of about 90 μm thickness in each case).

For preparation of all-solid-state electrochemical cells (ASSEC) 21 to 28, 100 mg of $Li_6PS_5Cl$ (each) was compressed at a pressure of 125 MPa, then 60 mg of anode composition (Anode 21 to 28, see table 5, above) was pressed to the solid electrolyte pellet at a pressure of 125 MPa and 10 to 11 mg of cathode composition (Cathode 21 to 28, see table 4, above) was pressed onto the other side of the solid electrolyte pellet (opposite the anode composition) at a pressure of 375 MPa.

Example 8: Determination of Initial Discharge Capacities of Solid-State and all-Solid-State Lithium-Ion Electrochemical Cells Electrochemical test runs were performed with solid-state lithium-ion electrochemical cells 1 to 7 and 11 to 17 and with all-solid-state lithium-ion electrochemical cells 21 to 26 and 28 (for preparations see example 7 above) at a pressure of 55 MPa, a temperature of 25° C. and a rate of C/10 (with 1 C=180 mA/g) in the voltage range between 1.35 and 2.85 V vs. $Li^+$/Li using a commercial battery cycler (Maccor).

Electrochemical test runs were performed with all-solid-state lithium-ion electrochemical cell 27 (for preparation see example 7 above) at a pressure of 55 MPa, a temperature of 45° C. and a rate of C/10 (with 1 C=190 mA/g) in the voltage range between 1.35 and 2.75 V vs. $Li^+$/Li using a commercial battery cycler (Maccor).

From these electrochemical test runs, the initial discharge capacities of the solid-state and the all solid-state lithium-ion electrochemical cells were determined using EC-Lab® software (BioLogic, France), based on the mass of the respective electrode active materials, and are shown in table 6 below.

Example 9: Determination of Initial Coulombic Efficiencies of Solid-State and all-Solid-State Lithium-Ion Electrochemical Cells Electrochemical test runs were performed with solid-state lithium-ion electrochemical cells 1 to 7 and 11 to 17 and with all-solid-state lithium-ion electrochemical cells 21 to 28 (for preparations see example 7 above) as outlined in example 8 above.

From these electrochemical test runs, the initial Coulombic efficiencies of the solid-state and the all solid-state lithium-ion electrochemical cells were determined as ratios of the output of charge to the input of charge in each case and are also shown in table 6 below (percentage value determined as: 100*charge capacity/discharge capacity).

TABLE 6

Initial discharge capacities and initial
Coulombic efficiencies of solid-state and
all-solid-state lithium-ion electrochemical cells

| Electrochemical Cell | Initial discharge capacities [mAh/g] | Initial Coulombic efficiencies [%] |
|---|---|---|
| SSEC 1 | 84.0 | 71.9 |
| SSEC 7 | 100.5 | 79.2 |
| SSEC 2 | 122.4 | 79.2 |
| SSEC 3 | 123.2 | 80.6 |
| SSEC 4 | 103.3 | 77.7 |
| SSEC 5 | 83.0 | 77.7 |
| SSEC 6 | 88.0 | 77.2 |
| SSEC 11 | 102.2 | 75.7 |
| SSEC 17 | 102.2 | 78.8 |
| SSEC 12 | 127.8 | 78.9 |
| SSEC 13 | 118.8 | 79.5 |
| SSEC 14 | 116.3 | 78.6 |
| SSEC 15 | 111.0 | 78.3 |
| SSEC 16 | 113.3 | 78.1 |
| ASSEC 21 | 147.9 | 77.9 |
| ASSEC 28 | 165.5 | 86.4 |
| ASSEC 22 | 160.7 | 84.1 |
| ASSEC 23 | 162.7 | 85.9 |
| ASSEC 24 | 167.7 | 84.5 |
| ASSEC 25 | 161.5 | 84.1 |
| ASSEC 26 | 165.7 | 85.0 |
| ASSEC 27 | 204.5 | 89.4 |

From the test results in table 6 (above) it can be seen that for all electrochemical cells the values for initial discharge capacities and Initial Coulombic efficiencies increased when a minimum amount or content of (lithium) carbonate was present in the coating of the coated particulate material of the cathode material.

For the solid-state electrochemical cells (SSEC 1 to SSEC 7 and SSEC 11 to SSEC 17) the values for initial discharge capacities and Initial Coulombic efficiencies decreased again once the optimal or preferred ranges of the amount or content of (lithium) carbonate in the coating were exceeded. By the present invention it is therefore possible to provide a coated particulate material, electrode and electrochemical cell, with optimized performance properties when using the at least one complex layered oxide as defined herein in a solid-state electrochemical cell, in particular when using a solid electrolyte material comprising lithium, sulfur and phosphorus with a lithium-ion conductivity at 25° C. of ≤1 mS/cm, in particular representing or comprising $Li_3PS_4$, preferably representing or comprising orthorhombic $\beta$-$Li_3PS_4$, as solid electrolyte.

For the all-solid-state electrochemical cells (ASSEC 21 to 27), using a solid electrolyte material comprising lithium, sulfur and phosphorus with a lithium-ion conductivity at 25° C. of >1 mS/cm, in particular a sulfide having a cubic crystal structure, preferably a cubic argyrodite crystal structure of formula Ill (as defined above), more preferably having the formula $Li_6PS_5Cl$, as solid electrolyte, the beneficially increased values for initial discharge capacities and initial Coulombic efficiencies did not decrease again when the amount or content of (lithium) carbonate in the coating was further increased. With this variant of the present invention, a coated particulate material for use as electrode active material in an electrode and/or in a solid-state lithium-ion electrochemical cell and/or in an all solid-state lithium-ion electrochemical cell is therefore provided, as well as respective electrode and electrochemical cell, which shows improved electrochemical properties over a wide range of coating compositions.

The invention claimed is:

1. A coated particulate material, comprising
   C1) a plurality of core particles, each core particle comprising at least one complex layered oxide comprising lithium,
      nickel and
      one or both members of the group consisting of cobalt and manganese,
   and
   C2) disposed on a surface of each core particle, a coating consisting of
      carbonate anions,
      one or more compounds selected from the group consisting of:
      lithium carbonate ($Li_2CO_3$),
      lithium niobate ($LiNbO_3$),
      lithium zirconate ($Li_2ZrO_3$),
      lithium tantalate ($LiTaO_3$),
      lithium phosphate ($Li_3PO_4$),
      lithium borate ($Li_3BO_3$),
      lithium aluminate ($LiAlO_2$), and
      $Li_6ZnNb_4O_{14}$, and
   at least one member of the group consisting of niobium, zirconium and mixtures thereof,
   wherein the at least one complex layered oxide of the core particles
   is or comprises a compound of formula IIa $$Li_{1+x}[Ni_{1-u-v}Co_uMn_v]_{1-x}O_2 \qquad (IIa),$$

wherein
   x is a number in the range of from −0.05 to 0.2,
   u is a number in the range of from 0.01 to 0.2,
   v is a number in the range of from 0.04 to 0.2
   and (u+v) is ≤0.4,
   and wherein the coating comprises carbonate anions in a total amount in the range of from ≥0.15 mass-% to 0.39 mass-%, relative to the total mass of the plurality of core particles.

2. The coated particulate material according to claim 1, wherein the at least one complex layered oxide of the core particles
   is a compound of formula IIa as defined in claim 1, wherein u is a number in the range of from 0.04 to 0.2 and/or
   comprises a crystallographic unit cell of space group R3m.

3. The coated particulate material according to claim 1, wherein the coating comprises niobium.

4. The coated particulate material of claim 1, wherein at least a part of the carbonate ions, present in the coating are present as lithium carbonate;

and/or the coating comprises at least one member of the group consisting of $LiNbO_3$, $Li_2ZrO_3$ and mixtures thereof.

5. The coated particulate material of claim 1, wherein a molar ratio of lithium: E in the coating is in the range of from 0.5 to 5.0, wherein E is selected from the group consisting of aluminium, boron, niobium, phosphorus, tantalum, zinc, zirconium and mixtures thereof, and/or a molar amount of E in the coating per g of the plurality of core particles is in the range of from 4 to 320 µmol/g.

6. A coated particulate material according to claim 1, configured for use as electrode active material in an electrode.

7. A coated particulate material according to claim 1 configured for use as a component of a solid-state lithium-ion electrochemical cell and/or of an all solid-state lithium ion electrochemical cell.

8. The coated particulate material of claim 1, wherein (u+v) is ≤0.3.

9. The coated particulate material of claim 4, wherein the coating comprises at least one member of the group consisting of $LiNbO_3$, $Li_2ZrO_3$ and mixtures thereof in a total amount in the range of from 0.1 mass-% to 3.0 mass-%, relative to the total mass of the plurality of core particles.

10. An electrode for use in a solid-state lithium-ion electrochemical cell and/or in an all solid-state lithium-ion electrochemical cell, comprising E1) as electrode active material a coated particulate material according to claim 1, preferably in a total amount of from 50 mass-% to 99 mass-%, relative to the total mass of the electrode, E2) a solid electrolyte material comprising lithium, sulfur and phosphorus, preferably in a total amount of from 1 mass % to 50 mass-%, relative to the total mass of the electrode, and preferably E3) electrically conductive carbon.

11. The electrode according to claim 10, wherein the solid electrolyte material E2)

is selected from the group consisting of a sulfide having a cubic crystal structure, preferably a cubic argyrodite crystal structure, more preferably having the formula III $$Li_{7-r-2s}PS_{6-r-s}X_r \qquad (III),$$

wherein

X is one or more members of the group consisting of chlorine, bromine, iodine, fluorine, cyanide, cyanate, thiocyanate and azide, preferably wherein X is chlorine, bromine or iodine, more preferably chlorine;

r is a number in the range of from ≥0.8 to ≤1.7;

and s is a number in the range of from >0 to ≤(−0.25 r)+0.5;

—$Li_3PS_4$, preferably orthorhombic $\beta$-$Li_3PS_4$, and mixtures thereof;

and/or has a lithium-ion conductivity at 25° C. of ≥0.15 mS/cm.

12. A method of making a coated particulate material according to claim 3, comprising M1) preparing a plurality of particles of at least one complex layered oxide of formula IIa, M2) preparing a liquid composition comprising a solvent and, at least partially dissolved in said solvent, lithium-ions, M3) preparing a liquid composition comprising an organic solvent and, at least partially dissolved in said organic solvent, at least one member selected from the group consisting of niobium ions, zirconium ions and mixtures thereof;

M4) contacting the components from M1) to M3) with each other,

M5) drying the contacted components from M4) and

M6) heating the contacted and dried components from step M5) at a temperature in the range of from 200° C. to 400° C., in the presence of carbon dioxide.

13. A coated particulate material prepared according to the method of claim 12.

14. A method of making an electrode for use in a solid-state lithium-ion electrochemical cell and/or in an all solid-state lithium-ion electrochemical cell, comprising M6a) preparing at least one coated particulate material according to claim 1, M7) preparing at least one solid electrolyte material comprising lithium, sulfur and phosphorus, M8) mechanically mixing the components from steps M6a) and M7) and optionally further components, with each other and M9) compressing the mixed components from step M8) at a pressure above atmospheric pressure.

15. An electrode prepared by the method according to claim 14.

16. An electrochemical cell comprising a coated particulate material according to claim 1.

17. An electrochemical cell, comprising an electrode according to claim 10.

* * * * *